(12) United States Patent
Zadorozny et al.

(10) Patent No.: US 10,623,513 B2
(45) Date of Patent: *Apr. 14, 2020

(54) MOBILE PUSH NOTIFICATION

(71) Applicant: Facebook, Inc., Menlo Park, CA (US)

(72) Inventors: Richard Kenneth Zadorozny, Menlo Park, CA (US); Mohit Talwar, Seattle, WA (US); Lev Popov, San Francisco, CA (US); Rose Yao, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,403

(22) Filed: Apr. 2, 2018

(65) Prior Publication Data
US 2018/0227380 A1 Aug. 9, 2018

Related U.S. Application Data

(63) Continuation of application No. 15/409,347, filed on Jan. 18, 2017, now Pat. No. 9,936,035, which is a
(Continued)

(51) Int. Cl.
| | |
|---|---|
| *G06F 15/16* | (2006.01) |
| *H04L 29/08* | (2006.01) |
| *G06Q 50/00* | (2012.01) |
| *G06Q 10/10* | (2012.01) |

(Continued)

(52) U.S. Cl.
CPC ............ *H04L 67/26* (2013.01); *G06Q 10/107* (2013.01); *G06Q 30/0261* (2013.01);
(Continued)

(58) Field of Classification Search
CPC ......... H04L 67/26; H04L 67/10; H04L 67/12; H04L 67/306; H04W 4/12; G06Q 10/107;
(Continued)

(56) References Cited

U.S. PATENT DOCUMENTS

| | | |
|---|---|---|
| 2006/0002383 A1 | 1/2006 | Jeong |
| 2010/0293105 A1* | 11/2010 | Blinn .................... G06Q 10/10 705/319 |

(Continued)

FOREIGN PATENT DOCUMENTS

JP   2005-332262 A   12/2005

OTHER PUBLICATIONS

Notice of Acceptance for Patent Application regarding Application No. 2017-204392 from Australian Government IP Australia, dated May 18, 2018.

(Continued)

*Primary Examiner* — Cheikh T Ndiaye
(74) *Attorney, Agent, or Firm* — Artegis Law Group, LLP

(57) ABSTRACT

In one embodiment, a method includes receiving content from a first user at a first time, determining whether one or more second users should be notified of the received content based on an associated first priority level, and sending a first notification to these second users. The first notification includes a subset of user-facing information of the received content. The method additionally includes receiving an update to the content from the first user at a second time which is later in time than the first time, determining whether one or more second users should be notified of the received update based on an associated second priority level, and sending a second notification to these second users. The second notification includes a second subset of the user-facing information associated with the received update.

20 Claims, 8 Drawing Sheets

Related U.S. Application Data continuation of application No. 14/983,073, filed on Dec. 29, 2015, now Pat. No. 9,591,091, which is a continuation of application No. 13/718,273, filed on Dec. 18, 2012, now Pat. No. 9,319,473.

(51) Int. Cl.
  *G06Q 30/02* (2012.01)
  *H04W 4/12* (2009.01)

(52) U.S. Cl.
  CPC ......... *G06Q 30/0267* (2013.01); *G06Q 50/01* (2013.01); *H04L 67/10* (2013.01); *H04L 67/12* (2013.01); *H04L 67/306* (2013.01); *H04W 4/12* (2013.01)

(58) Field of Classification Search
  CPC . G06Q 30/0261; G06Q 30/0267; G06Q 50/01
  See application file for complete search history.

(56) References Cited

U.S. PATENT DOCUMENTS

| | | | |
|---|---|---|---|
| 2011/0029512 A1* | 2/2011 | Folgner | G06F 16/9566 707/726 |
| 2011/0196933 A1* | 8/2011 | Jackson | G06Q 10/107 709/206 |
| 2011/0258268 A1* | 10/2011 | Banks | G06Q 10/06 709/206 |
| 2011/0307403 A1 | 12/2011 | Rostampour | |
| 2012/0060105 A1 | 3/2012 | Brown | |
| 2012/0278475 A1 | 11/2012 | Papakipos | |
| 2013/0078951 A1* | 3/2013 | Mun | G06F 21/305 455/411 |
| 2014/0067964 A1* | 3/2014 | Grishaver | G06Q 50/01 709/206 |
| 2014/0074922 A1* | 3/2014 | Bell | G06Q 50/01 709/204 |

OTHER PUBLICATIONS

KR NOA from KIPO for Patent Application No. 10-2017-7016826. (with English Translation), Jul. 2, 2018.

IL Office Action received for Patent Application No. 252930. (with English Translation), dated Jun. 24, 2018.

Notification of Reasons for Rejection for JP Patent Application No. 2018-109535 (with English translation), dated Apr. 16, 2019.

* cited by examiner

MOBILE PUSH NOTIFICATION

PRIORITY

This application is a continuation under 35 U.S.C. § 120 of U.S. patent application Ser. No. 15/409,347, filed 18 Jan. 2017, which is a continuation under 35 U.S.C. § 120 of U.S. patent application Ser. No. 14/983,073, filed 29 Dec. 2015, issued as U.S. Pat. No. 9,591,091, which is a continuation under 35 U.S.C. § 120 of U.S. patent application Ser. No. 13/718,273, filed 18 Dec. 2012, issued as U.S. Pat. No. 9,319,473.

TECHNICAL FIELD

This disclosure generally relates to mobile computing devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may push to a user's mobile client computing device a first notification about a stateful object. The stateful object may be an object (e.g., a status update, a photo, a location check-in) hosted by the social-networking system. At a later time, the social-networking system may push to the mobile client computing device a second notification related to the stateful object. Instead of all the information related to the stateful object, the second notification may comprise just incremental state changes related to the stateful object since the first notification.

DESCRIPTION OF EXAMPLE EMBODIMENTS

Figure 1:
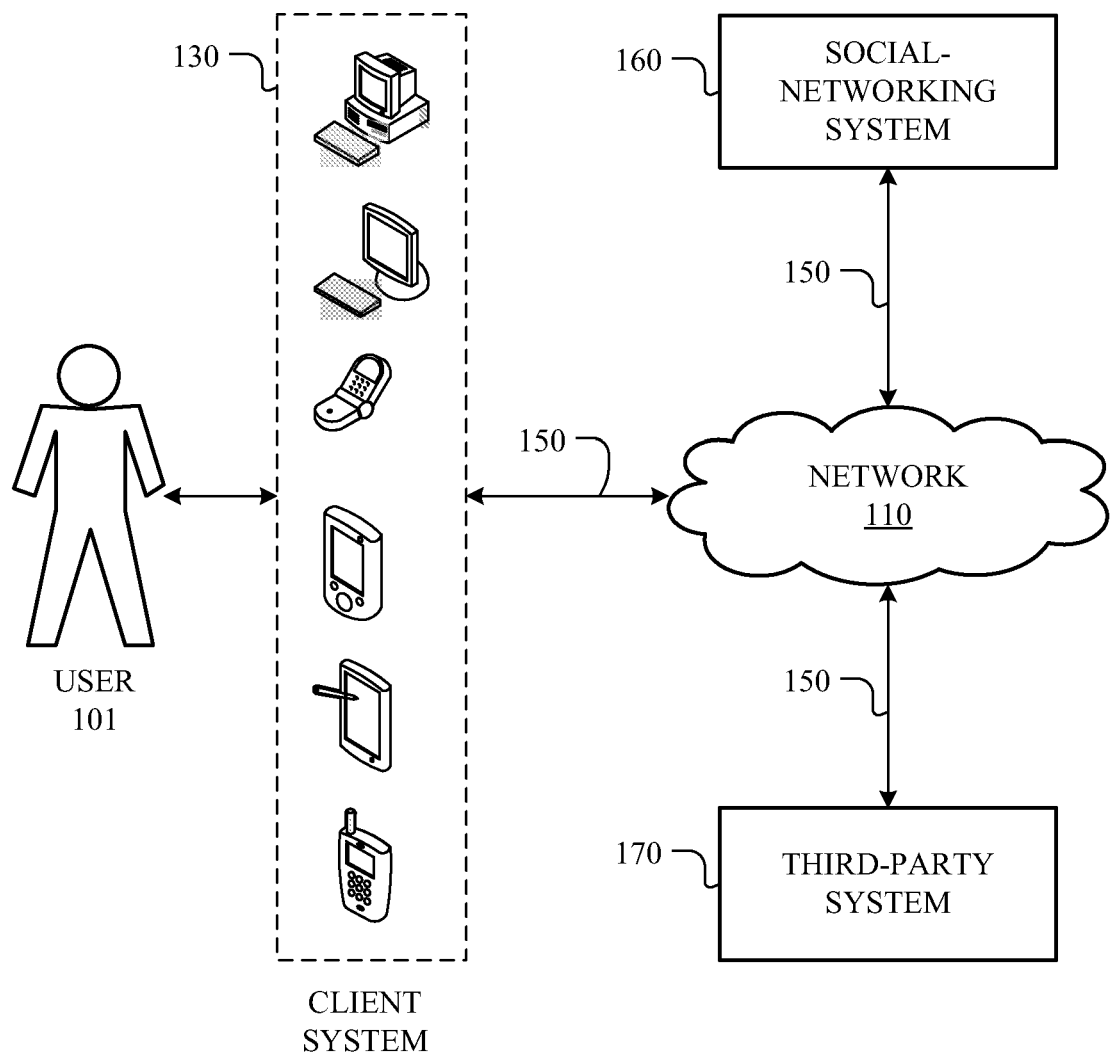
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host websites or applications. Third-party system 170 may generate, store, receive, and transmit third-party system data, such as, for example and without limitation, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
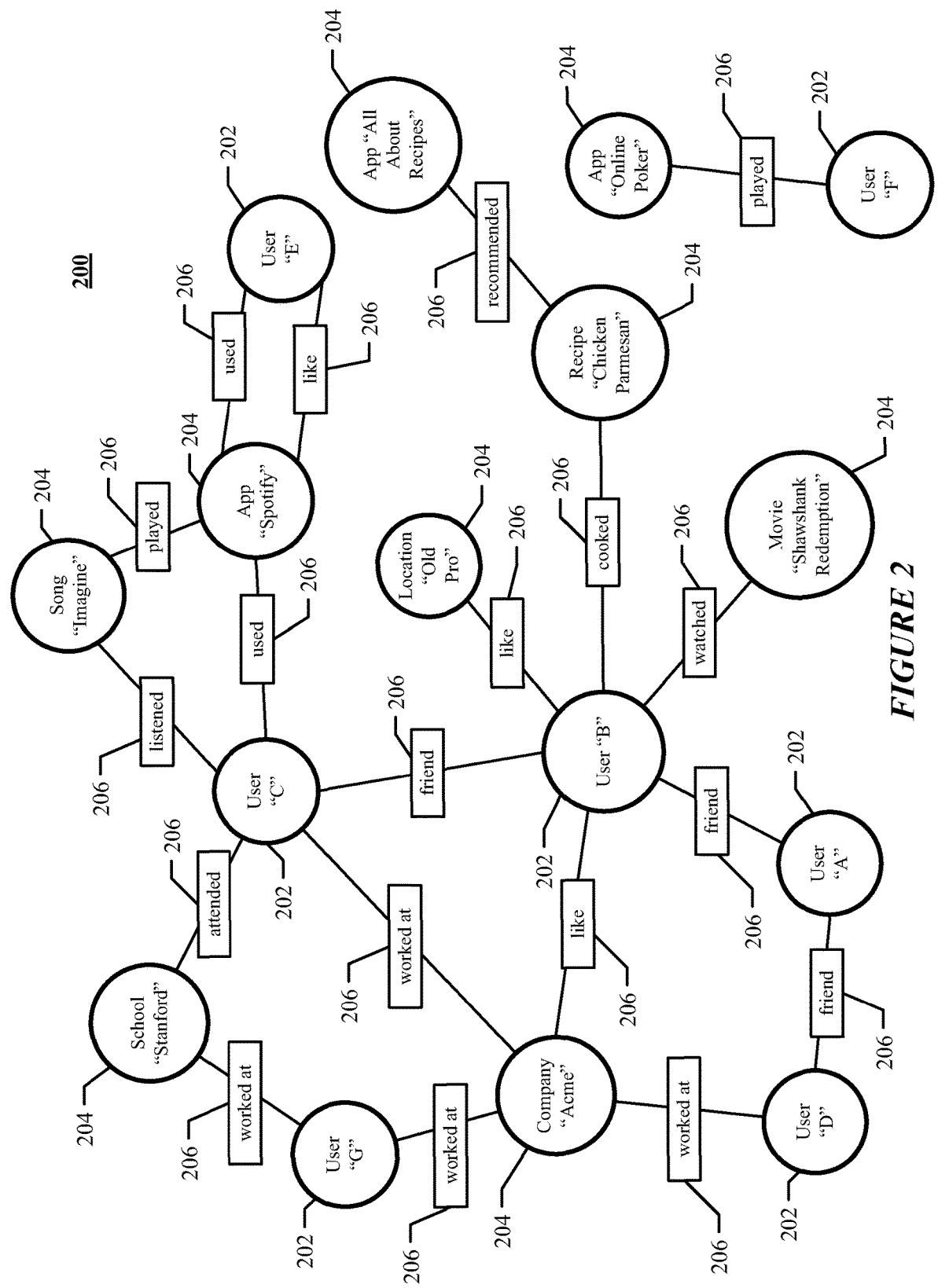
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web pages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web pages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops required to traverse the social graph from one node to the other. A degree of separation between two nodes can be considered a measure of relatedness between the users or the concepts represented by the two nodes in the social graph The social-networking system may provide to a user frequently update content based on recorded activities or actions that may be related to the user. In particular embodiments, the social-networking system may support a news-feed service. In particular embodiments, a news feed may comprise a data format including one or more news-feed stories. Each news-feed story may include content related to a specific subject matter or topic. In particular embodiments, the social-networking system may aggregate activities or actions related to a specific user action into a news-feed story. For example, a first user may post a photo to the social-networking system, while other users of the social-networking system may perform various activities or actions related to the photo. Other users may "like" the photo, post comments related to the photo, or tag one or more particular users to the photo. The social-networking system may aggregate activities related to the photo into a news-feed story comprising an image of the photo, a profile picture of the first user, a count of "likes" of the photo by other users, and one or more comments related to the photo. As for another example, a first user may checks in to a webpage (maintained by the social-networking system or a third-party system) corresponding to a place (e.g., a landmark, a restaurant, a department store). Other users of the social-networking system may "like" the check-in activity, or post comments related to the check-in activity. The social-networking system may aggregate activities related to the check-in activity into a news-feed story comprising a link and an image of the webpage, a profile picture of the first user, a count of "likes" of the check-in activity by other users, and one or more comments related to the check-in activity. The social-networking system may also aggregate into the news-feed story update to the webpage, or advertising related to the webpage (e.g., on-line coupons from a business related to the webpage). In particular embodiments, the social-networking may present a news feed including one or more news-feed stories to a viewing user. For example, an application (e.g., a web browser) hosted by a client device of the viewing user may retrieve a news feed from the social-networking system and display the news feed in the application's user interface. The application may display each news-feed story in the news feed in a respective frame (e.g., an HTML iFrame) in the application's user interface.

The social-networking system may aggregate activities or actions into news-feed stories based on social-graph information. For example, the social-networking system may aggregate for a viewing user a news feed including news-feed stories related to activities or actions performed by users who are within a specified degree of separation (e.g., within two degrees of separation) from the viewing user on the social graph. The social-networking system may aggregate activities or actions into news-feed stories based on privacy settings. For example, a user may specify which other users can access information of a particular activity performed by the user. The social-networking system may aggregate for a viewing user a news feed including news-feed stories related to activities accessible to the viewing user.

The social-networking system may maintain state information of a process, a program, or an object hosted by the social-networking system. The state information may comprise current or last-known status of a process, a program, or an object. That is, an object (or a process, a program) hosted by the social-networking system may be a stateful object as its state information is maintained by the social-networking system. The social-networking system may maintain and store state information of an object with a node (or edge) corresponding to the object in a social graph of the social-networking system. For example, a post (e.g., a status update, a photo, an Universal Resource Locator or URL link, a location check-in) posted to the social-networking system by a user may be a stateful object. The social-networking system may maintain state information in access status of the post. For example, the social-networking system may record whether a particular user has access the post from a web page hosted by the social-networking system. For example, the social-networking system may record whether the post has been transmitted to a mobile client computing device of a particular user.

An object hosted by the social-networking system may comprise user-facing information—i.e., information associated with the object that one or more users of the social-networking system can interact with. In particular embodiments, the social-networking system may maintain state information for user-facing information of a stateful object. For example, an object of a post may comprise user-facing information such as "likes" and comments associated with the post object. The social-networking system may maintain state information in "likes" and comments associated with the post. For example, the social-networking system may record the last count of "likes" and the last count of comments that has been transmitted to a mobile client computing device of a particular user. For each of the comments associated with the post, the social-networking system may also record whether the comment has been transmitted to the mobile client computing device of the particular user.

Figure 3:
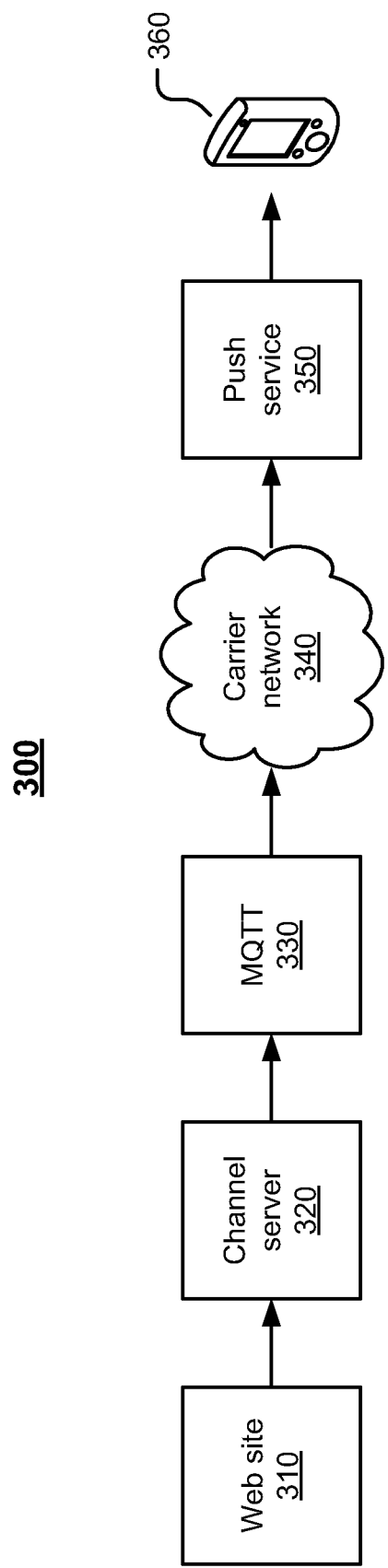
FIG. 3 illustrates an example push channel.

A web site such as the social-networking system may provide a push notification service to users of the web site. A notification may be transmitted (pushed) from the web site to a client computing device of a user through a push channel. FIG. 3 illustrates an example push channel 300 for push notification. In the example of FIG. 3, a server of a web site 310 may generate a notification for a user. For example, the server may generate a notification such as a text message in response to another user's input. For another example, the server may generate a notification such as a news-feed story based on activities performed by the user's social connections as described earlier. For example, the notification may be a text message such as an instant message (IM) or an Short Message Service (SMS) message, an Multimedia Messaging Service (MMS) message, an on-line chat message, an email, a news-feed story, an advertisement, or any combinations of those. The server may transmit the notification to a channel server 320. The channel server 320 may maintain for each receiving user a queue of notifications. The channel server 320 may transmit the notification to a MQ Telemetry Transport (MQTT) server 330. The MQTT server 330 may maintain a persistent connection with the user's mobile client computing device 360. The persistent connection may comprise a Transmission Control Protocol (TCP) or Internet Protocol (IP) connection. The MQTT server 330 may transmit the notification to a carrier network 340. The carrier network 340 may comprise a local area network, a wide area network, a metropolitan area network, a portion of the Internet, a cellular network, or a combination or two or more or theses. A push service 350 hosted by the carrier network may transmit the notification from the carrier network 340 to the user's mobile client computing device 360. The push service 350 may also be hosted by the web site 310. For example, the push service 350 may be hosted by the social-networking system. Particular embodiments contemplate any suitable entities hosting the push service 350.

Figure 4A:
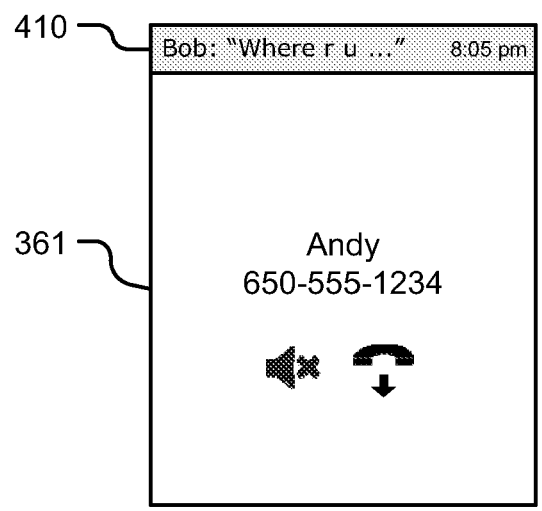
FIGS. 4A and 4B illustrate examples for displaying a notification on a mobile client computing device.
Figure 4B:
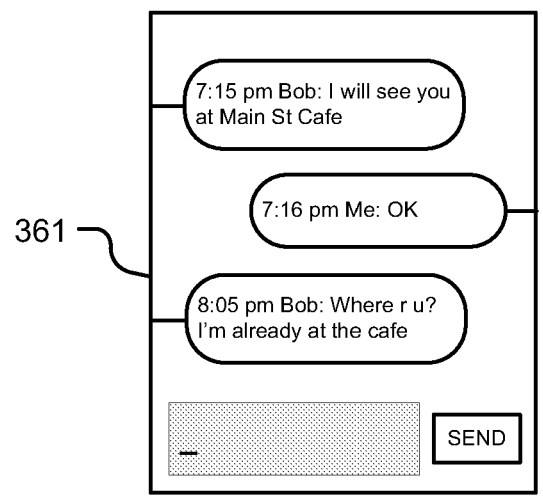

Notifications pushed to the mobile client computing device may be provided for multiple applications for consumption. For example, a notification may be displayed in a web browser or a messaging application hosted by the mobile client computing device. An operating system of the mobile client computing device may also display a notification in a notification area of a home screen shown in a display of the mobile client computing device. In particular embodiments, upon receiving the notification, a software application such as an alert controller hosted by the mobile client computing device 360 may determine a display of the notification based on the user's activity at the mobile client computing device 360. FIGS. 4A and 4B illustrate examples for displaying a notification on a mobile client computing device. In the example of FIG. 4A, if the alert controller detects that the user is in a phone call session, the alert controller may cause the notification to be displayed in a small area 410 on a top portion of a display 361 of the mobile client computing device 360. If the user is inactive at the mobile client computing device 360, the alert controller may cause the notification to be displayed in a user interface (e.g., of an instant messaging application) that encompasses an entire area of the display 361, as illustrated in FIG. 4B. That is, if the user is interacting with the mobile client computing device 360 (or a foreground process is running on the mobile client computing device 360), the alert controller may cause the notification to be displayed in a minimal, non-intrusive manner. If the user is inactive with the mobile client computing device 360, the alert controller may cause the notification to be displayed in a more telling, content-rich manner.

To provide a lively and interactive experience for a user, it is desirable to push a notification about an activity to the user's client computing device as the activity happens, or as one or more changes related to the activity happen. For example, when a user post a status update to the social-networking system, the social-networking system may push a notification to the user's particular friend. The social-networking system may also push another notification to the particular friend when another user makes a comment on the status update. Meanwhile, pushing notifications about the activity and changes related to the activity whenever a change happens can require additional resources in bandwidth of a push channel for the push notifications. Particular embodiments describe methods for efficient push notifications. Particular embodiments may push notifications based on incremental state changes of a stateful object.

Figure 5:
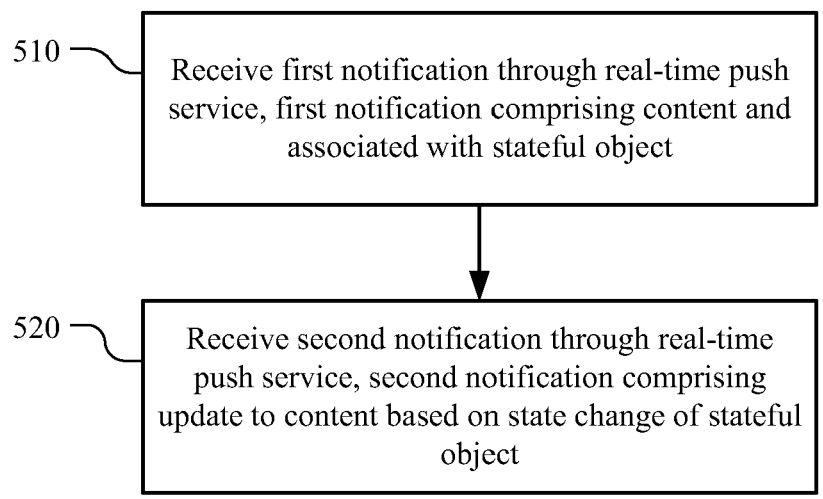
FIG. 5 illustrates an example method for push notifications.

FIG. 5 illustrates an example method 500 for push notifications. The example method 500 may be implemented by a mobile client computing device associated with a user. For example, the example method 500 may be implemented by a process of an application (or an operating system) running on one or more processors of the mobile client computing device. The mobile client computing device may be a cellular phone, a smartphone, a tablet computer, a laptop computer, or any suitable mobile computing device. The method may begin at step 510. In particular embodiments, at step 510, the mobile client computing device may receive a first notification through a real-time push service. For example, the real-time push service may be provided by a web site such as the social-networking system. For example, the notification may be pushed to the mobile client computing device by the real-time push service through the push notification channel 300 illustrated in FIG. 3.

In particular embodiments, the first notification may comprise content and being associated with a stateful object. In particular embodiments, the stateful object may be hosted by the social-networking system as described earlier. For example, the stateful object may be a post such as a photo posted to the social-networking system as described earlier. The first notification may comprise content associated with the stateful object. For example, the first notification may comprise a message (e.g., "Jeff posted a photo") and a payload (e.g., an image file for the photo). In one embodiment, the first notification may comprise the message only. For another example, the first notification may comprise a news-feed story about the photo including a message (e.g., "Jeff posted a photo"), a count of "likes" associated with the photo, a count of comments on the photo, and an image file for the photo. The news-feed story may also include text strings for one or more comments.

In particular embodiments, at step 520, the mobile client computing device may receive a second notification through the real-time push service. In particular embodiments, the second notification may comprise an update to the content (of the first notification) based on a state change of the stateful object. That is, instead of pushing to the mobile client computing device a second notification comprising all the information related to the stateful object, the social-networking system may push a second notification comprising incremental state changes (related to the stateful object) since the first notification.

Figure 6A:
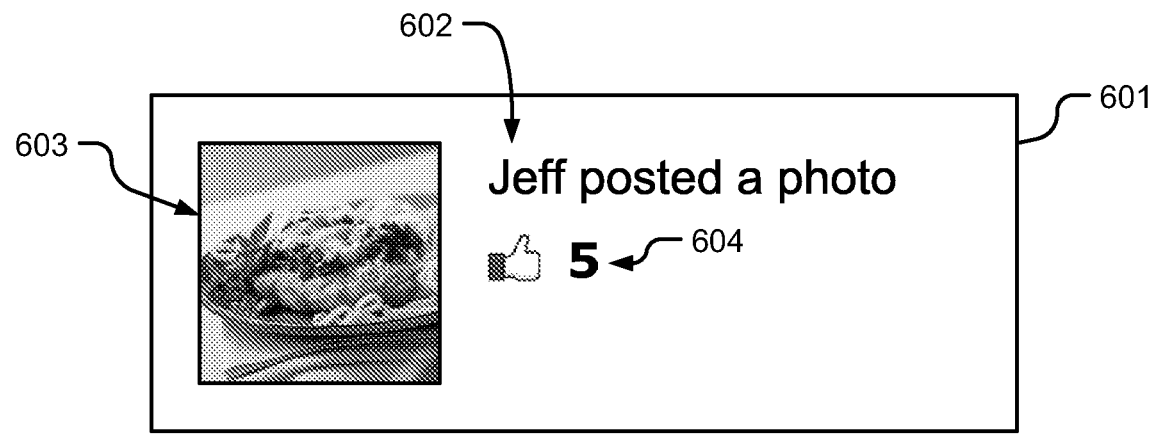
FIGS. 6A and 6B illustrate an example news-feed story.
Figure 6B:
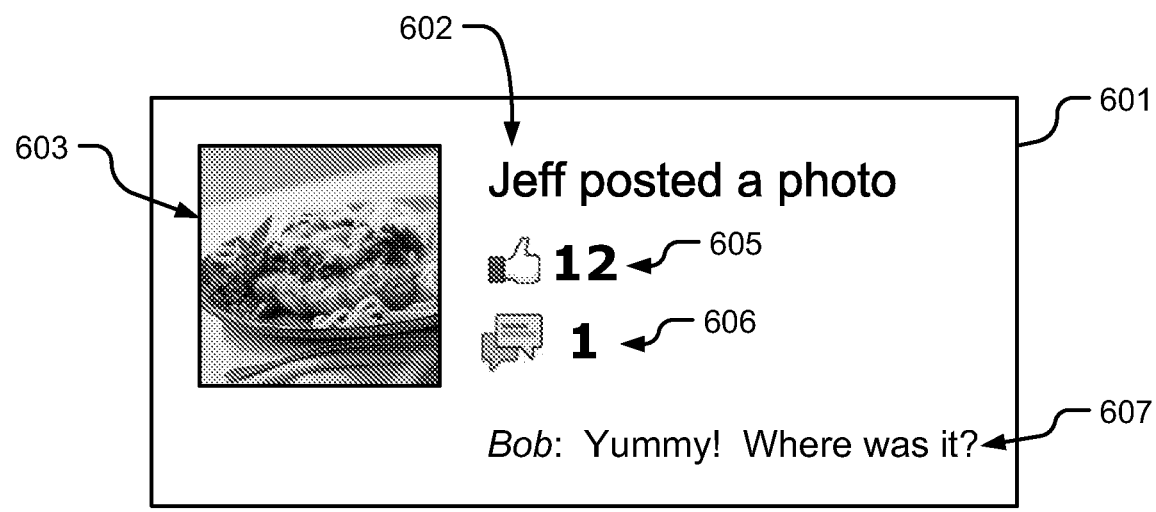

For example, the social-networking system may push to the mobile client computing device notifications associated with a stateful object of a photo posted to the social-networking system. The photo post object may comprise user-facing information including a message, an image file for the photo, and a count of 5 "likes" at a first time instance when the a first notification is pushed to the mobile client computing device. Upon receiving the first notification (including the message, the image file, and the count of 5 "likes"), the mobile computing device may present in a user interface (e.g., a web browser) a news-feed story including the message, the image file, and the count of 5 "likes", as illustrated in FIG. 6A. FIG. 6A illustrates an example news-feed story 601 comprising the message (602), the image (603), and the count of 5 "likes" (604) that are pushed to the mobile client computing device with the first notification. At a second time instance after the first time instance, the photo post object may comprise user-facing information including the message, the image file, a count of 12 "likes", a count of one comment, and a text string for the one comment. That is, the stateful photo post object has state changes in the number of "like" count, the number of comment count, and a new comment. Based on the state changes, the social-networking system may transmit to the mobile client computing device a second notification comprising an update including all the user-facing information that is new at the second time instance (but was not sent to the mobile client computing device at the first time instance): the count of 12 "likes", the count of one comment, and the text string for the one comment. Upon receiving the second notification, the mobile client computing device may access locally cached copies of the message and the image file (that were received with the first notification), and present in a user interface a news-feed story including the message, the image file, the count of 12 "likes", the count of one comment, and the text string for the one comment, as illustrated in FIG. 6B. FIG. 6B illustrates the news-feed story 601 with content from the second notification. The news-feed story 601 may comprise the count of 12 "likes" (605), the count of one comment (606), and the text string of the one comment (607) that are pushed to the mobile client computing device with the second notification (i.e., content that are new at the second time instance). The news-feed story 601 may also comprise the message 602 and the image 603 that have not been changed since the first notification (and are not part of the second notification).

In other embodiments, notifications pushed to the mobile client computing device may comprise content including a pre-determined subset of the user-facing information. For example, the pre-determined subset may include a message, an image file, and a count of "likes" for the photo post object above. The social-networking system may transmit to the mobile client computing device a first notification including the message, the image file, and the count of 5 "likes" at the first time instance. Accordingly, the social-networking system may transmit to the mobile client computing device a second notification comprising an update including the count of 12 "likes" at the second time instance. The pre-determined subset may be configured by a receiving user of the push notifications, or by the social-networking system.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Notifications may be pushed to the mobile client computing device based on priority, a power state of the mobile client computing device, and a network state of the mobile client computing device. For example, the social-networking system may assign an immediate, nice-to-have, or low priority to a notification. For example, a notification may have an immediate priority if the notification is an instant message, a message of a stateful object newly posted to the social-networking system, or of a category desired or configured by a receiving user. A notification may have a nice-to-have priority if the notification is an update to a previous notification as described in the example method of FIG. 5. A notification may have a low priority if the notification is about a friend updating his or her profile picture stored in the social-networking system. The mobile client computing device may transmit its power state and network state to the social-networking system periodically or when the power or network state changes. For example, the social-networking system may transmit only notifications of the immediate priority to the mobile client computing device if the mobile client computing device has a low power state (e.g., the device's battery is less than 20 percent of its full capacity) or has a lower-bandwidth network connection (e.g., 2G cellular connection). For example, the social-networking system may transmit notification of all priorities to the mobile client computing device if the mobile client computing device has a high power state (e.g., the device's battery is more than 70 percent of its full capacity, or is being charged) or has a higher-bandwidth network connection (e.g., 3G or Wi-Fi wireless connection).

Figure 7:
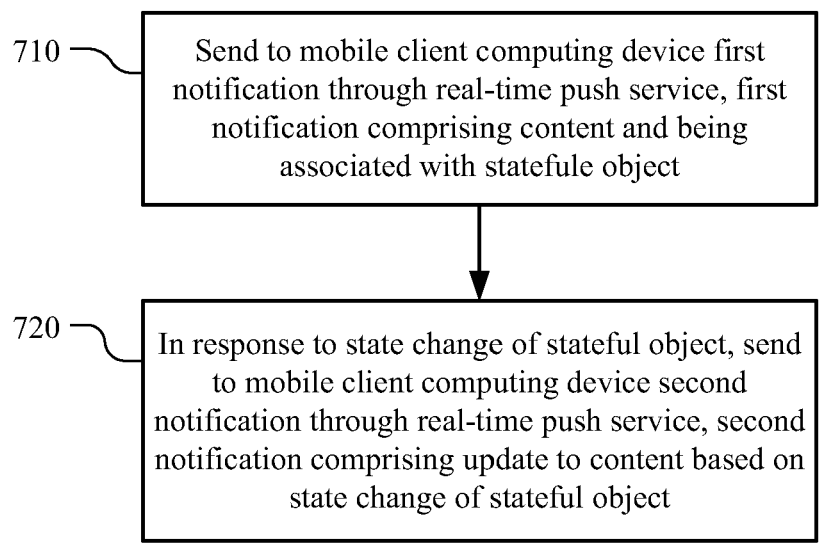
FIG. 7 illustrates another example method for push notifications.

The push notifications based on incremental state change of a stateful object described above may also be implemented by an example method 700 illustrated in FIG. 7. The method 700 may begin at step 710. In particular embodiments, at step 710, one or more computing devices may send to a mobile client computing device a first notification through a real-time push service. The real-time push service may comprise the push notification channel 300 illustrated in FIG. 3. That is, one or more computing devices (e.g., servers) of the web site 310 may send to a mobile client computing device 360 a first notification through the push notification channel 300. In particular embodiments, the first notification may comprise content and being associated with a stateful object. The stateful object may be hosted by the social-networking system. For example, the stateful object may be a post such as a photo posted to the social-networking system as described earlier. The first notification may comprise a message and an image payload for the photo. The first notification may comprise a news-feed story about the photo including a message, a count of "likes" associated with the photo, a count of comments on the photo, an image file for the photo, and text strings for one or more comments.

In particular embodiments, at step 720, the one or more computing devices may, in response to a state change of the stateful object, send to the mobile client computing device a second notification through the real-time push service. The second notification may comprise an update to the content based on the state change of the stateful object. Furthermore, the second notification may be configured for display by the mobile client computing device. For example, in response to one or more new comments (or "likes") associated with the photo post described above, the one or more computing devices may send to the mobile client computing device a second notification comprising update to user-facing information (or a sub-set of user-facing information) such as text strings for the new comments and a new count of "likes." The second notification may be configured to cause the mobile client computing device to update a display of a news-feed story associated with the photo post as illustrated in the examples of FIGS. 6A and 6B.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
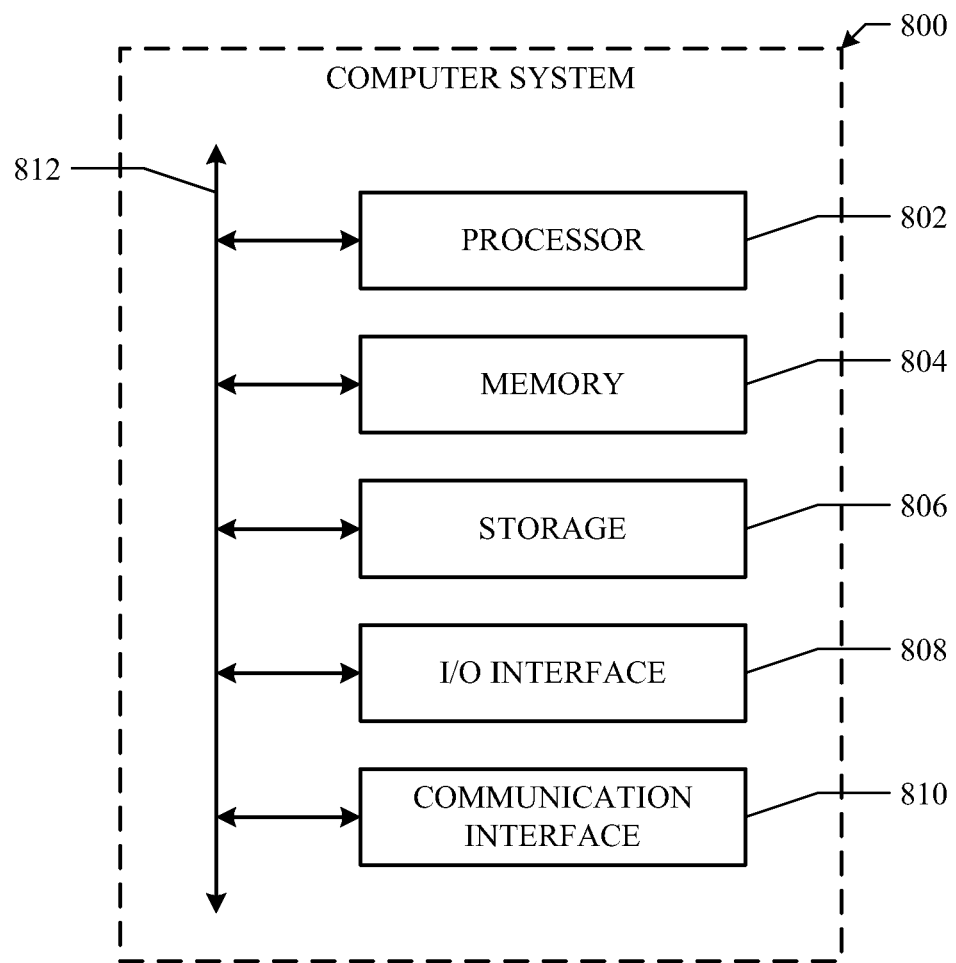
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:

receiving, from a first mobile device associated with a first user at a first time, content associated with an object, the object being associated with one or more states;

determining, based on the one or more states, a first priority level associated with the one or more states associated with the received content, wherein the first priority level indicates whether one or more second users should be notified of the received content;

sending, to one or more second mobile devices associated with one or more of the second users, a first notification comprising a first subset of user-facing information associated with the received content responsive to the determined first priority level indicating the one or more second users should be notified of the received content;

receiving, from the first mobile device at a second time, an update to the content based on a state change of at least one of the one or more states of the object, the second time being later in time than the first time;

determining, based on the state change, a second priority level that is associated with the state change of the updated content, wherein the second priority level indicates whether one or more of the second users should be notified of the received update; and sending, to one or more of the second mobile devices associated with one or more of the second users, a second notification comprising a second subset of the user-facing information associated with the received update responsive to the determined second priority level indicating the one or more of the second users should be notified of the received update.

2. The method of claim 1, wherein the first or second notification is displayed on a display of the respective second mobile device.

3. The method of claim 1, wherein the object is hosted by a social-networking system.

4. The method of claim 3, wherein the object is a user post to the social-networking system.

5. The method of claim 4, wherein the user-facing information of the object comprises one or more of:
a number of likes associated with the user post; or
a number of comments associated with the user post.

6. The method of claim 1, wherein the object is associated with a node in a social graph maintained by a social-networking system.

7. The method of claim 1, wherein the first notification comprises a message and a payload.

8. The method of claim 1, wherein the sending of the first or second notification is via a communications network.

9. The method of claim 1, wherein:
the sending of the first notification is determined by:
a priority level of the first notification;
a first power state of the respective second mobile device; and
a first network state of the respective second mobile device; and
the sending of the second notification is determined by:
a priority level of the second notification;
a second power state of the respective second mobile device; and
a second network state of the respective second mobile device.

10. The method of claim 9, wherein:
the first power state and the first network state are sent by the respective mobile device to the one or more computing devices prior to the first time; and
the second power state and the second network state are sent by the respective mobile device to the one or more computing devices after the first time and prior to the second time.

11. One or more computer-readable non-transitory storage media embodying software that is operable when executed to:

receive, from a first mobile device associated with a first user at a first time, content associated with an object, the object being associated with one or more states;

determine, based on the one or more states, a first priority level associated with the one or more states associated with the received content, wherein the first priority level indicates whether one or more second users should be notified of the received content;

send, to one or more second mobile devices associated with one or more of the second users, a first notification comprising a first subset of user-facing information associated with the received content responsive to the determined first priority level indicating the one or more second users should be notified of the received content;

receive, from the first mobile device at a second time, an update to the content based on a state change of at least one of the one or more states of the object, the second time being later in time than the first time;

determine, based on the state change, a second priority level that is associated with the state change of the updated content, wherein the second priority level indicates whether one or more of the second users should be notified of the received update; and send, to one or more of the second mobile devices associated with one or more of the second users, a second notification comprising a second subset of the user-facing information associated with the received update responsive to the determined second priority level indicating the one or more of the second users should be notified of the received update.

12. The media of claim 11, wherein the object is hosted by a social-networking system.

13. The media of claim 12, wherein the object is a user post to the social-networking system.

14. The media of claim 13, wherein the user-facing information of the object comprises one or more of:
a number of likes associated with the user post; or
a number of comments associated with the user post.

15. The media of claim 11, wherein the object is associated with a node in a social graph maintained by a social-networking system.

16. The media of claim 11, wherein the first notification comprises a message and a payload.

17. The media of claim 11, wherein the sending of the first or second notification is via a communications network.

18. The media of claim 11, wherein:
the sending of the first notification is determined by:
a priority level of the first notification;
a first power state of the respective second mobile device; and
a first network state of the respective second mobile device; and
the sending of the second notification is determined by:
a priority level of the second notification;
a second power state of the respective second mobile device; and
a second network state of the respective second mobile device.

19. The media of claim 18, wherein:
the first power state and the first network state are sent by the respective mobile device to the one or more computing devices prior to the first time; and
the second power state and the second network state are sent by the respective mobile device to the one or more computing devices after the first time and prior to the second time.

20. A system comprising: one or more processors; and a memory coupled to the processors comprising instructions executable by the processors, the processors being operable when executing the instructions to:

receive, from a first mobile device associated with a first user at a first time, content associated with an object, the object being associated with one or more states;

determine, based on the one or more states, a first priority level associated with the one or more states associated with the received content, wherein the first priority level indicates whether one or more second users should be notified of the received content;

send, to one or more second mobile devices associated with one or more of the second users, a first notification comprising a first subset of user-facing information associated with the received content responsive to the determined first priority level indicating the one or more second users should be notified of the received content;

receive, from the first mobile device at a second time, an update to the content based on a state change of at least one of the one or more states of the object, the second time being later in time than the first time;

determine, based on the state change, a second priority level that is associated with the state change of the updated content, wherein the second priority level indicates whether one or more of the second users should be notified of the received update; and send, to one or more of the second mobile devices associated with one or more of the second users, a second notification comprising a second subset of the user-facing information associated with the received update responsive to the determined second priority level indicating the one or more of the second users should be notified of the received update.

\* \* \* \* \*